Oct. 20, 1931.  E. F. ROSSMAN  1,828,445
SHOCK ABSORBER
Filed June 12, 1929   4 Sheets-Sheet 1

Inventor
Edwin F. Rossman
By
Spencer, Hardman and Dehr
Attorneys

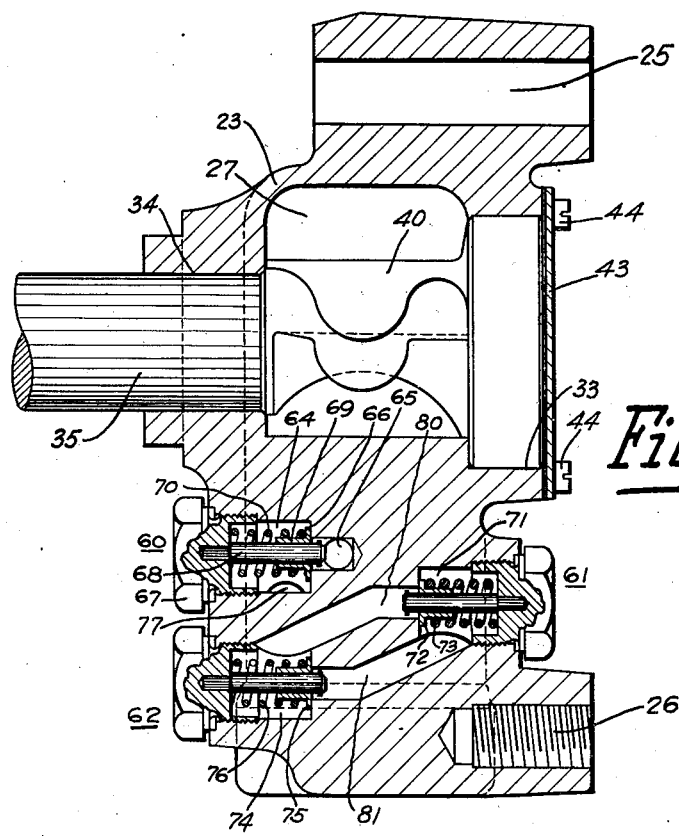
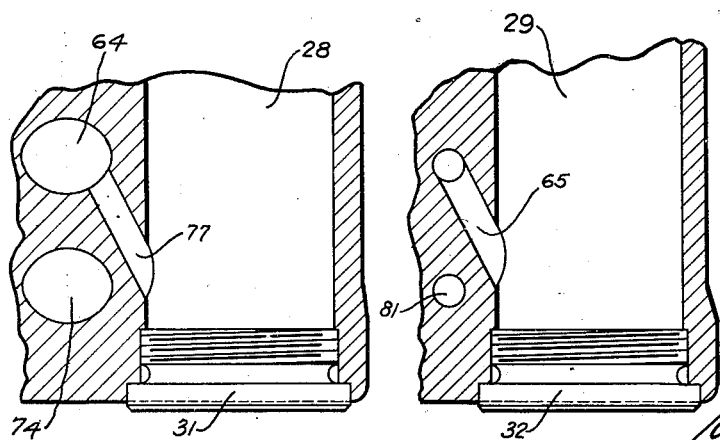

Oct. 20, 1931.  E. F. ROSSMAN  1,828,445
SHOCK ABSORBER
Filed June 12, 1929   4 Sheets-Sheet 4

Patented Oct. 20, 1931

1,828,445

UNITED STATES PATENT OFFICE

EDWIN F. ROSSMAN, OF DAYTON, OHIO, ASSIGNOR TO DELCO PRODUCTS CORPORATION, OF DAYTON, OHIO, A CORPORATION OF DELAWARE

SHOCK ABSORBER

Application filed June 12, 1929. Serial No. 370,267.

This invention relates to improvements in shock absorbers, particularly adapted to cushion the movement of two relatively movable members, for example the frame and axle of a vehicle.

It is among the objects of the present invention to provide a shock absorber adapted to resist and cushion both the approaching and separating movements of the frame and axle of a vehicle for purposes of dissipating road shocks and substantial transmission thereof to the vehicle frame.

Further objects and advantages of the present invention will be apparent from the following description, reference being had to the accompanying drawings wherein a preferred form of embodiment of one form of the present invention is clearly shown.

In the drawings:

Fig. 5 is a cross sectional view taken along the line 5—5 of Fig. 2.

Fig. 6 is a fragmentary sectional view taken along the line 6—6 of Fig. 4.

Fig. 7 is a view similar to Fig. 6 taken along the line 7—7 of Fig. 4.

Figure 1:
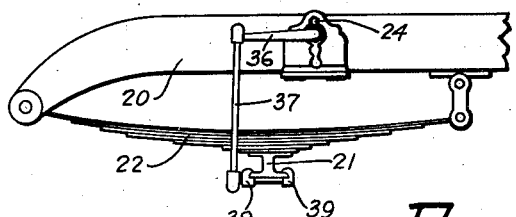
Fig. 1 illustrates the front portion of the frame of an automotive vehicle supported by springs upon the usual axle, the shock absorber embodying the present invention being shown applied thereto.

Referring to the drawings, and particularly to Fig. 1, the frame of the vehicle is designated by the numeral 20. This frame is supported upon the vehicle axle 21 by springs 22, only one of which is shown.

The shock absorber comprises a casing 23 having an aperture 25 and a screw-threaded recess 26 for receiving bolts 24, which secure the shock absorber to the frame 20. Casing 23 presents a fluid reservoir 27 and two cylinders 28 and 29, the cylinders being separated by a partition 30. The cylinders 28 and 29 communicate with the fluid reservoir 27. The outer ends of the cylinders are closed by screw plugs 31 and 32, the former closing the cylinder 28, the latter the cylinder 29.

The casing 23 is provided with coaxially aligned bearing portions 33 and 34 which rotatably support the rocker shaft 35. The opening which provides bearing 33 is closed by an end cover plate 43 properly gasketed, said cover plate being secured to the casing by screws 44, thus the opening which provides bearing 33 is properly sealed against fluid leaks. The portion of the shaft 35 journalled in the bearing 34 extends to the outside of the casing. Any suitable packing gland may be provided about this portion of the shaft so as to prevent fluid leaks through the bearing 34. The shaft 35 has an operating arm 36 outside the shock absorber casing, the end of which is swivelly attached to one end of a connecting link 37, the opposite end of said link being secured to the bracket 38 which is anchored to the axle 21 by a clamp 39. Within the fluid reservoir 27 the rocker shaft 35 has a rocker lever 40 secured thereto so that said rocker lever will rotate with said shaft. The rocker lever has oppositely disposed arm portions 41 and 42, the arm portion 41 being positioned substantially in alignment with the cylinder 28, while the arm portion 42 of the rocker lever is positioned substantially in alignment with the cylinder 29.

The cylinders 28 and 29 are provided with reciprocative pistons 45 and 46 respectively. Inasmuch as both pistons are exactly alike in construction, only one of them will be described detailedly, reference being had to the piston 45.

In the piston head there is provided a passage 50 adapted to provide for the transfer of fluid from one side of the piston to the other. Upon the piston head a wear piece 51 is slidably carried, said wear piece being concaved, preferably spherically, to receive the rocker arm 41. A spring 47 is interposed between the piston 45 and the screw plug 31 in the cylinder 28, said spring yieldably urging the piston upwardly so that its wearpiece 51 will be maintained in engagement with the rocker arm 41. Within the piston there is provided an inwardly extending annular flange 52 having an annular ridge 53 providing a valve-seat for the valve 55 which is slidably supported upon the pin 54, rigidly carried in the piston head. Valve 55 is normally urged into engagement with the valve seat 53 by a spring 56 interposed between the valve 55 and a retainer cup 57 secured to the end of pin 54 in any suitable manner. The piston 46 is urged upwardly by a spring 48 so that its wearpiece, corresponding to wearpiece 51 of the piston 45, will be maintained normally in engagement with the rocker arm 42.

As has been mentioned heretofore, the present device is adapted to control the approaching and separating movements of the frame and axle of a motor vehicle. The approaching movement of these two members is caused by the road wheels, not shown, striking an obstruction in the roadway resulting in a flexing of the springs 22 toward the frame 20. The movement of the axle 21 and its springs 22 toward the frame 20 will cause the connecting link 37 to operate the lever 36 so that the rocker lever 40 will be rotated in a clockwise direction, thus the rocker arm 42 will move the piston 46 toward the plug 32 in the cylinder 29 and at the same time spring 47 will cause piston 45 to be moved upwardly, following the clockwise movement of the rocker arm 41. The movement of the piston 46 downwardly toward the plug 32 exerts a pressure upon the fluid within the cylinder 29, which, as will be described later, causes a flow from the cylinder 29 to the cylinder 28, this flow being restricted so that the flexing movement of the springs 22 toward the frame 20 will be resisted. Movement of the piston 45 upwardly in response to the flexing movement of springs 22 will permit valve 55 to open for purposes of replenishing the fluid within the cylinder 28 which may have leaked past the piston 45 upon any of its downward strokes.

After the springs 22 have been flexed in accordance with the obstruction met by the roadwheels, the tendency of the springs is to return to normal, unflexed position with a sudden, rebounding movement, which, if permitted, results in the transmission of disagreeable shocks to the frame 20. To substantially eliminate such shocks, the present device controls said return movement of the springs 22 to unflexed position. In returning to unflexed position, the movement of the axle 21 secured to the springs 22 away from the frame 20 will cause link 37 to move the arm 36 counter-clockwise, thus rocker lever 40 will be moved counter-clockwise and rocker arm 41 will move the piston 45 downwardly or toward the screw plug 31 of cylinder 28, while spring 48 will cause the piston 46 to follow the counter-clockwise movement of the rocker arm 42. Movement of the piston 45 toward the plug 31 creates fluid pressure within the cylinder 28 which will establish a restricted flow from the cylinder 28 to the cylinder 29, the restriction creating a resistance against the unflexing movement of the springs 22.

By referring to Figs. 10, 11, 12 and 13, a graphic illustration of the control valves between the cylinders 28, 29 and their positions for establishing fluid flows may be had. In the Fig. 10 pistons 45 and 46 are shown in normal position, valves 55 being closed so that no fluid may flow through the passages 50. Three pressure release devices 60, 61 and 62 are provided between the two cylinders. The pressure release device 60 may be termed the low pressure release device for the control of spring compression, the device 61 may be termed the high pressure release device for the control of spring compression, and the device 62 may be referred to as the spring rebound control device. All of these devices are constructed similarly with the exception of the springs therein, so for the sake of brevity only the device 60 will be described detailedly.

The device 60 is in a recess 64 provided in the casing 23, said recess having an extending portion 65 of smaller diameter than the main portion whereby a shoulder 66 is presented providing a valve-seat in said recess. A screw plug 67 is screw-threaded into the outer end of the recess 64, said screw plug supporting a valve pin 68 so that it will extend coaxially through the recess into the smaller diameter portion 65 thereof, the pin 68 being of lesser diameter than said smaller diameter portion. Upon the pin 68 a valve 69 is slidably supported, which is yieldably urged into sealing engagement with the shoulder or valve seat 66 by a spring 70 interposed between the valve 69 and the screw plug 67. Referring to the high pressure release device 61, it may be seen that its recess is designated by the numeral 71, the valve member in said recess by the numeral 72 and the spring controlling said valve 72 is designated by the numeral 73. The detail parts of the spring rebound control device 62 comprise the recess 74 containing valve 75 which is urged into engagement with its valve seat by the spring 76.

Figures 10, 11:
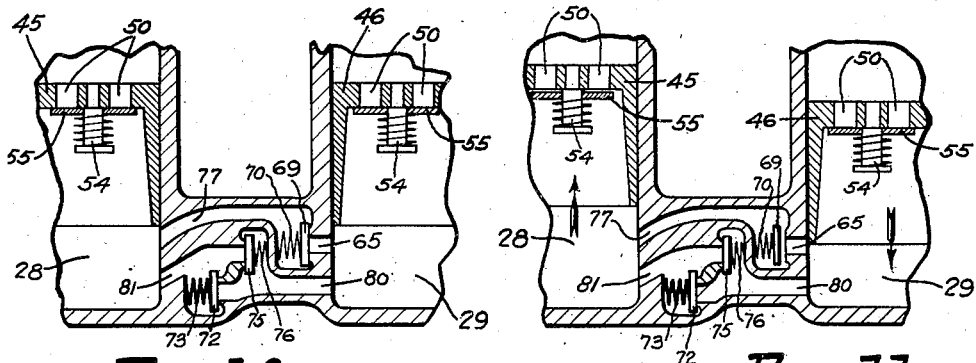
Fig. 10 is a diagrammatic view of the shock absorber showing the fluid controlling devices in their normal position.
Fig. 11 is a view similar to Fig. 10, showing the device in the initial spring compression resisting position.

As has been mentioned before, when the road wheels of the vehicle strike an obstruction, piston 46 will be moved toward the bottom of its cylinder 29, causing fluid pressure within said cylinder. In Fig. 11 the result of the movement of piston 46 downwardly is diagrammatically shown. Here the valve 69 is shown off its seat establishing a fluid flow from the cylinder 29 through passages 65 and 77 into the cylinder 28, the flow being restricted by the valve 69 in accordance with the pressure in the cylinder 29. This fluid flow will be maintained while the piston 46 is moved downwardly until the skirt of the piston 46 covers the passage 65, in which case, as shown in Fig. 12, valve 69 will again be closed by its spring 70 and the higher fluid pressure in the cylinder 29 will be exerted upon valve 72, which will then open to establish a flow from cylinder 29 through passages 80 and 81 into the cylinder 28, the fluid flow being restricted by the valve 72 in accordance with the higher pressure in cylinder 29. In each instance the restriction to the flow of fluid through passages 65 and 77 by the valve 69, or through passage 80—81 by the valve 72 as shown in Figs. 11 and 12 respectively, will cause piston 46 to resist the spring compression movement of the axle 21 toward the frame 20, and thus jars and jolts to the frame 20 because of the striking of obstructions in the roadway are substantially cushioned and eliminated.

Figures 12, 13:
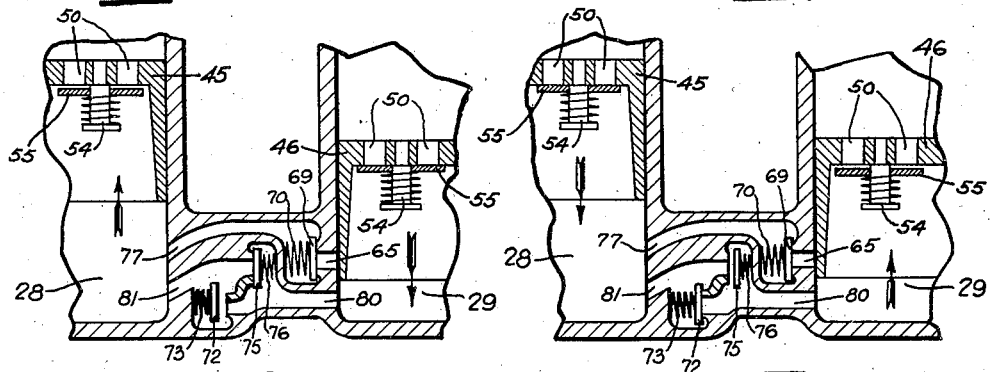
Fig. 12 is a view similar to Fig. 10, showing the device in the full spring compression resisting position.
Fig. 13 is a view similar to Fig. 10, showing the device in the spring rebound resisting position.
Figure 8:
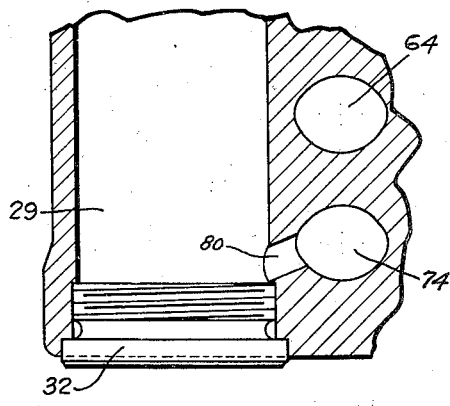
Fig. 8 is a view similar to Fig. 6 taken along the line 8—8 of Fig. 4.
Figure 9:
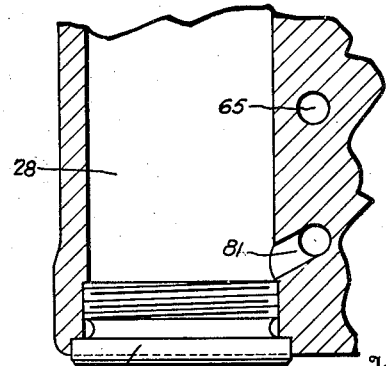
Fig. 9 is a view similar to Fig. 6 taken along the line 9—9 of Fig. 4.

In Fig. 13 the fluid flow control mechanism for controlling the spring rebound movement is shown in operating position. In this instance the piston 46 is moving upwardly away from the bottom of its cylinder and the piston 45 is being moved downwardly toward the bottom of its cylinder. The fluid pressure is now increased within the cylinder 28 and when transmitted to passage 77 it meets the relief side of valve 69 tending to close said valve tightly. No escape being had through the passage 77, the fluid pressure will be exerted through passage 81, it first meeting the relief side of valve 72 and thus finding no escape, said fluid pressure will be exerted upon the pressure side of valve 75 causing said valve to open and consequently establishing a flow of fluid from the cylinder 28 through passages 81 and 80 into the cylinder 29, the valve 75 restricting this flow of fluid in accordance with the fluid pressure within cylinder 28. This restriction to the flow from cylinder 28 to cylinder 29 will resist the unflexing movement or the movement of the spring toward its normal position, sudden rebounding thereof being substantially prevented and thus rebound shocks and jolts are practically eliminated.

It may readily be seen that the effects of the present device may be altered by changing the springs 70, 73 and 76. If higher tension springs are used the valves will offer greater resistance to the flow of fluid and thus the shock absorber will render greater resistance to the movement of the spring and axle and frame, causing a less flexible ride to be obtained than if springs of lesser tension were used.

Figure 2:
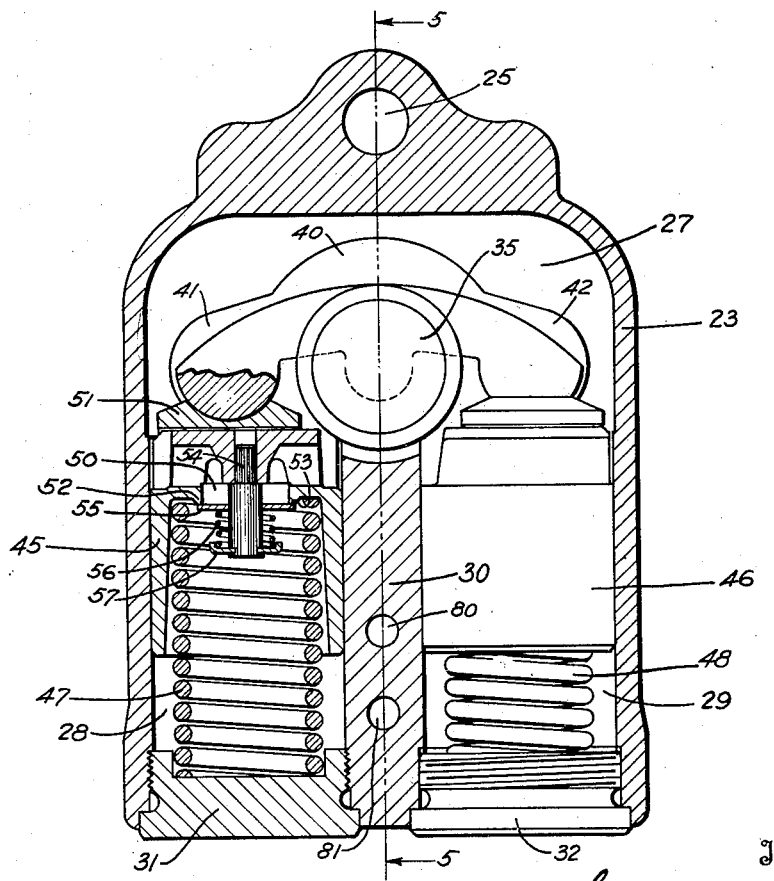
Fig. 2 is a sectional view taken vertically through the axis of both cylinders of the shock absorber, certain parts being shown in elevation for the sake of clearness.
Figure 3:
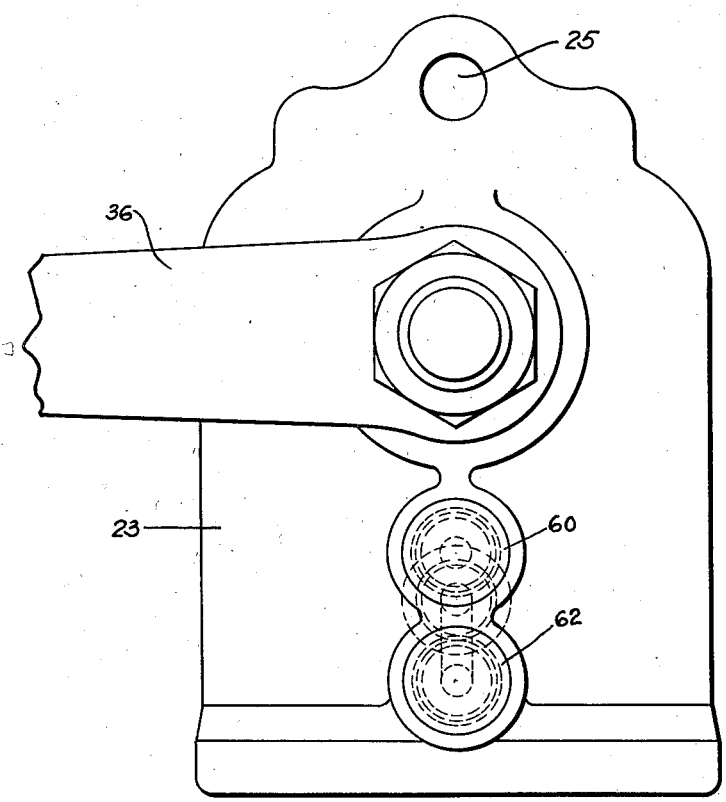
Fig. 3 is a front elevation of the shock absorber.
Figure 4:
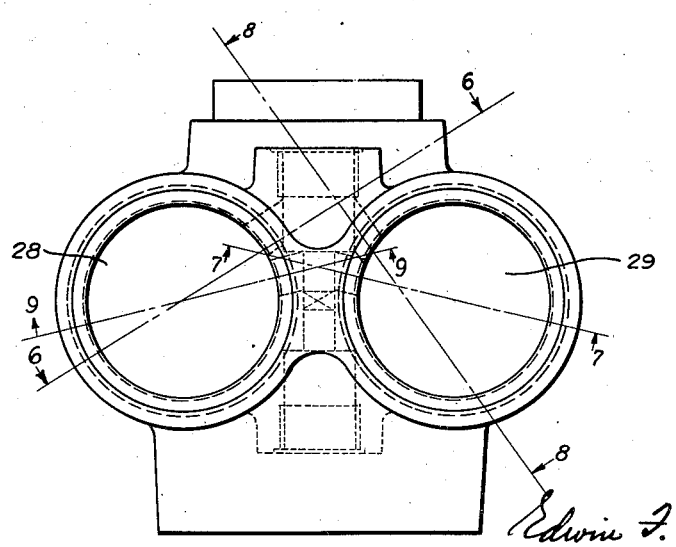
Fig. 4 is an inverted plan view of the shock absorber.

The present device provides accessible valves which may easily be changed to alter the characteristics of the shock absorber. The device may be built compactly and may be used both in a vertical position as shown in the Fig. 2, or the shock absorber may be arranged so that the cylinders lie horizontally of the frame 20.

While the form of embodiment of the present invention as herein disclosed constitutes a preferred form, it is to be understood that other forms might be adopted, all coming within the scope of the claims which follow.

What is claimed is as follows:

1. A shock absorber comprising in combination, a casing presenting a fluid reservoir and two cylinders; a piston in each cylinder forming a compression chamber therein; a plurality of passages in the casing providing communication between the compression chambers, one of said passages providing such communication only during a portion of the range of movement of the piston; check valves in certain of said passages, adapted to act successively to establish flows of fluid from the one cylinder, through their respective passages into the other cylinder in response to increased fluid pressures in said one cylinder; and a check valve in another of said passages, operable to establish a return flow of fluid into the first mentioned cylinder in response to a predetermined increase in fluid pressure within the second mentioned cylinder.

2. A shock absorber comprising in combination, a casing presenting a fluid reservoir and two cylinders; a piston in each cylinder; two ducts in the casing providing separate communicating passages between the cylinders, one of said ducts having a shunt passage, the other providing communication between the cylinders only while the pistons are moving through a portion of their range of movement; a valve in each of said ducts adapted to establish successively, a flow of fluid from the one cylinder to the other in response to increased fluid pressures within the said one cylinder; and a valve in the shunt passage, adapted to establish a return flow of fluid into the first mentioned cylinder, through portions of the one duct, in response to a predetermined high fluid pressure within the second mentioned cylinder.

3. A device for cushioning the movements of two relatively movable members comprising, in combination, a casing adapted to be connected to one of said members, said casing presenting two cylinders and a fluid reservoir; a piston in each of said cylinders, connected to the other relatively movable member; a plurality of valved passages in the casing adapted successively to establish restricted flows of fluid from one cylinder into the other to control the approaching movement of said relatively movable members, one of said passages being closed by the piston after it has been moved a predetermined distance by said approaching movement of the relatively movable members and a valved passage in the casing adapted to establish a restricted return flow of fluid into the first mentioned, one cylinder for controlling the separating movement of the two relatively movable members.

4. A device for cushioning the movements of two relatively movable members, one of which is a spring, comprising in combination, a casing having a fluid reservoir and two cylinders; a piston in each cylinder forming a compression chamber therein one of which is the "spring compression control chamber" the other the "spring rebound control chamber"; a plurality of valve chambers in the casing, each provided with a check-valve; a duct leading from the spring compression control chamber to the pressure side of one of the check-valves; a duct leading from the spring rebound control chamber to the relief side of said check valve; a duct leading from the spring compression control chamber to the pressure side of a second check valve and to the relief side of a third check valve; and a duct leading from the spring rebound control chamber to the relief side of the said second check valve and to the pressure side of the said third check valve.

5. A device for cushioning the movements of two relatively movable members comprising in combination, a casing presenting a fluid reservoir and two cylinders; a piston in each cylinder; means in each piston for establishing a substantially unrestricted flow of fluid from the fluid reservoir into the cylinders in response to the movement of the respective pistons in the one direction; parallel valved passages between the cylinders, adapted to establish successively, separate restricted flows of fluid from the one cylinder into the other in response to the approaching movement of the two relatively movable members the one valved passage being rendered ineffective to establish a flow between the cylinders, by the piston after it has been moved a predetermined distance on its pressure stroke; and a valved passage between the cylinders, adapted to establish a restricted return flow of fluid to the first mentioned, one cylinder in response to the separating movements of the two relatively movable members.

6. A device for cushioning the movements of two relatively movable members comprising in combination, a casing presenting a fluid reservoir and two cylinders; a piston in each cylinder; means in each piston for establishing a substantially unrestricted flow of fluid from the fluid reservoir into the cylinders in response to the movement of the respective pistons in the one direction; parallel valved passages between the cylinders, adapted to establish successively, separate, differently restricted flows of fluid from the one cylinder into the other in response to the approaching movement of the two relatively movable members the less restricted flow being entirely cut off by the piston after it has been moved a predetermined distance on its pressure stroke; and a valved passage between the cylinders in shunt connection with one of said parallel valved passages, adapted to establish a restricted return flow of fluid to the first mentioned, one cylinder in response to the separating movements of the two relatively movable members.

7. A device for cushioning the movements of two relatively movable members comprising, in combination, a casing presenting a fluid reservoir and two cylinders; means for establishing a substantially unrestricted flow of fluid from the fluid reservoir into the respective cylinders in response to the movement of the respective pistons in one direction; means for establishing restricted flows of fluid from one cylinder into the other in response to approaching and separating movements of the relatively movable members, said means comprising two check valves spring loaded at different degrees and adapted successively to control the flow of fluid from one cylinder to the other as the relatively movable members approach each other, one of said valves being rendered ineffective to establish a fluid flow between the cylinder, by the piston, after it has been moved a predetermined distance on its pressure stroke by the approaching movement of said relatively movable members and a single check valve adapted to control the return flow of fluid as the said movement of the members is reversed.

In testimony whereof I hereto affix my signature.

EDWIN F. ROSSMAN.